United States Patent [19]

Chu et al.

[11] 4,410,452

[45] Oct. 18, 1983

[54] METHOD OF PREPARATION OF COMPOSITE ZEOLITE CATALYSTS

[75] Inventors: Pochen Chu, West Deptford, N.J.; Francis G. Dwyer, West Chester; Albin Huss, Chadds Ford, both of Pa.

[73] Assignee: Mobil Oil Corporation, New York, N.Y.

[21] Appl. No.: 375,078

[22] Filed: May 5, 1982

Related U.S. Application Data

[63] Continuation-in-part of Ser. No. 222,848, Jan. 6, 1981, Pat. No. 4,335,020.

[51] Int. Cl.$^3$ .......................... B01J 29/06; B01J 29/28
[52] U.S. Cl. ...................................................... 502/60
[58] Field of Search ..................... 252/455 Z; 423/329

[56] References Cited

U.S. PATENT DOCUMENTS

| | | | |
|---|---|---|---|
| 3,766,093 | 10/1973 | Chu ................................. | 252/455 Z |
| 4,139,600 | 2/1979 | Rollmann ........................... | 423/329 |
| 4,335,020 | 6/1982 | Chu et al. ........................ | 252/455 Z |

*Primary Examiner*—Carl F. Dees
*Attorney, Agent, or Firm*—Michael G. Gilman; Charles J. Speciale

[57] ABSTRACT

A method of removing the organic cation from an organic cation-containing zeolite which comprises contacting the zeolite at low temperatures with an aqueous sodium hypochlorite solution.

24 Claims, No Drawings

METHOD OF PREPARATION OF COMPOSITE ZEOLITE CATALYSTS

CROSS REFERENCE TO RELATED APPLICATION

This is a continuation-in-part of application Ser. No. 222,848, filed Jan. 6, 1981, now U.S. Pat. No. 4,335,020.

BACKGROUND OF THE INVENTION

1. Field of the Invention

This invention is concerned with the removal of organic cations from organic cation-containing molecular sieves or zeolites. More specifically, this invention is directed to a chemical treatment of organic cation-containing zeolites to facilitate removal of the organic cation from the zeolite and to render it more suitable for subsequent ion exchange, and/or improve the dispersive and catalytic properties thereof.

2. Discussion of the Prior Art

Molecular sieves or zeolites have, for some time, been known to be crystalline and to have a rigid three-dimensional structure wherein the pores of the material are uniform. These materials, especially when ion exchanged, are useful in the field of catalysis, especially for the conversion of hydrocarbons.

Prior art techniques have resulted in the formation of a great variety of synthetic zeolites. These materials have come to be designated by letters or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-21 and 38 (U.S. Pat. No. 4,046,859), and zeolite ZSM-23 (U.S. Pat. No. 4,076,842) merely to name a few.

Certain zeolites function desirably as shape selective catalysts. Zeolites are generally useful for alkylation, polymerization (depending upon pore size of the molecular sieve), isomerization of aliphatics and aromatics, dealkylation and reforming. More recently, molecular sieves have been prepared by including in the reaction mixture an organic cation. A typical type of organic cation is a quaternary ammonium cation, such as tetramethylammonium. It is supplied to the reaction mixture in the form of a salt such as tetramethylammonium chloride or tetramethylammonium sulfate. Additionally, it can be supplied to the reaction mixture in alkaline form as tetramethylammonium hydroxide. It has become desirable to convert the as-synthesized form of these organic cation-containing zeolites to remove the organic cation and through base exchange and calcination to convert the same to a more highly catalytically active form. Heretofore, the organic cation has been removed by subjecting the zeolite as synthesized to an elevated temperature, such treatment being referred to as precalcination. Thereafter, the zeolite is treated in accordance with known techniques to convert it to the desired form through base exchange and final calcination.

Unfortunately, the precalcination procedure heretofore employed has required high temperatures which are not generally beneficial to the crystallinity of the zeolite material. Additionally, such high temperature precalcination, at temperatures ordinarily between 700° and 1200° F., adds to the cost of converting the organic cation-containing zeolite to a more preferably catalytically-active form.

In the preparation of zeolite containing composite catalysts, i.e., zeolite plus a binder or matrix, it is necessary that the procedure transform the catalytic composite to the active catalytic form without damaging or impairing the catalytic potential of the composite. It is also important that the dispersion in the catalytic composite be such that uniformity of catalyst composition, good physical properties and high utilization of the catalytic component (usually the zeolite) are attained.

In the preparation of catalysts employing zeolite components that have been crystallized with and contain organic components either as cations or occluded material, it is necessary to remove the organic compound so that other cations, such as sodium, can be removed and replaced with cations that will result in an active catalytic form. In cases where other cations are not present in amounts sufficient to impair catalytic activity, the organic cations must nevertheless be removed to make the catalytically active form. In either case, the organic material must be removed in such a manner as not to damage the zeolite, such as thermal damage if the organics are oxidized too rapidly in an air calcination.

Two methods have been used to remove the organic material from zeolites. One conventional method involves calcination in a non-oxidizing atmosphere, e.g., $N_2$, $NH_3$, steam, etc. The second method involves an aqueous liquid phase oxidation at elevated temperatures as covered in U.S. Pat. No. 3,766,093.

When zeolite containing catalysts are prepared in form for use in a continuous fluidized bed process, final calcination is not necessarily required, since the fresh catalyst make-up is usually added to the high temperature regenerator portion of the process and calcination to remove water and other volatiles is effectively done in the regenerator. With catalysts, which are comprised of organic containing zeolites, adding uncalcined catalyst to the regenerator would probably result in thermal damage to the zeolite due to the excessive heat released as the organics are burned.

SUMMARY OF THE INVENTION

Broadly, this invention contemplates a method of removing the organic species from an organic cation-containing zeolite which comprises contacting the said zeolite at low temperatures with a solution of a compound, which has a standard oxidation potential of at least 0.25 volt.

The crystalline zeolite materials employed herein are those having a constraint index between 1 and 12 and a $SiO_2/Al_2O_3$ mole ratio greater than 12, more particularly the zeolites ZSM-5, ZSM-11, ZSM-12, ZSM-21, ZSM-23, ZSM-35, and ZSM-38, all of which are identified hereinabove, and are incorporated herein by reference.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention process, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of an equal weight of normal hexane and 3-methylpentane over a small sample, approximately 1 gram or less, of catalyst at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint index (C.I.) values for some typical zeolites are:

| Zeolite | C.I. |
|---|---|
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| ZSM-48 | 3.4 |
| TMA Offretite | 3.7 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range of 1 to 12. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest, is approximate, taking into consideration the manner of its determination, with probability, in some instances, of compounding variable extremes. However, in all instances, at a temperature within the above-specified range of 550° F. to 950° F., the constraint index will have a value for any given zeolite of interest herein within the approximate range of 1 to 12.

DISCUSSION OF PREFERRED EMBODIMENTS

It has now been found, in accordance with this invention, that the organic species of organic cation-containing zeolites can be removed by a simple treatment with a certain class of compounds in solution. Specifically it has been found that by treating organic cation-containing zeolites with a solution containing a soluble compound which has a standard oxidation potential of at least 0.25 volt that the organic species not only can be removed, but the resultant form of the zeolite, when ion exchanged, is superior to that form which would be obtained if the organic species were removed by the previously known precalcination procedure. Generally speaking, the organic cation is removed by contact of the zeolite with a solution of a soluble compound, which has a standard oxidation potential of at least 0.25 volt. Preferably, the oxidation potential of such compound is at least 0.5 volt and between 0.5 and 2.00 volt. Suitable compounds having such oxidation potential include the chlorates ($ClO_3^-$), the hypochlorites ($OCl^-$), the permanganates ($MnO_4^-$), the dichromates ($Cr_2O_7^{--}$) and hydrogen peroxide ($H_2O_2$). Such compounds have the following respective standard oxidation potentials: 0.63 volt, 0.89 volt, 1.23 volt, 1.33 volt and 1.77 volt. Compounds having an oxidation potential greater than 2.00 include the peroxy-sulfate and ozone. The aforementioned compounds can be in association with various types of cations employed in the treating solution. For instance, the compound can be in the form of a metal salt typified by an alkali metal salt such as the sodium or potassium salt. Additionally, the compound can be in the form of an ammonium salt, the sole criterion being that the oxidation potential of the compound be at least 0.25 volt and preferably between 0.5 and 2.00 volt. Compounds which have an excessively high oxidation potential are undesirable, as they may cause some damage to the zeolite structure itself.

The compound utilized, in the process of the present invention, having an oxidation potential of at least 0.25 volt, is generally employed in its aqueous solution form. The solvent for the compound can be any of a wide variety, particularly those solvents having at least a minor degree of polarity. Particularly contemplated solvents include water, alcohols, ketones, acids, aldehydes, dimethylsulfoxide and dimethylformamide. Additionally, materials such as carbon tetrachloride and carbon disulfide can be used as solvents. Of the foregoing, water and alcohol are the most desirable because of their availability, inexpensiveness and their exceptional solvent properties for most of the compounds contemplated for use in the present invention.

The concentration of the oxidation compound in the solution is not particularly critical. Naturally, if an extremely dilute solution of the oxidation agent is employed, a longer contact time may be needed. Conversely, if the solution is highly concentrated, the contact time of the solution with the zeolite may be relatively short. Generally speaking, the concentration of the agent in solution is between 0.1% and 30%, by weight, and preferably between 1% and 15%, by weight. The contact time of the solution with the zeolite generally ranges between 0.5 hour and 72 hours and preferably between 4 hours and 16 hours, with time being an inverse function of concentration.

Surprisingly, in contrast to the method disclosed in the aforesaid U.S. Pat. No. 3,766,093, the contact of the solution with the zeolite is generally effected at temperatures below 100° F. and preferably between about 50° F. and 100° F. It was thought in that patent that temperatures below 100° F. generally were insufficient to permit the oxidizing agent to have sufficient effect upon the organic cation of the zeolite to accomplish the desired degree of removal of the cation from the zeolite.

Particularly contemplated agents for use in the present invention are sodium hypochlorite, ammonium dichromate, potassium permanganate and hydrogen peroxide as well as sodium chlorate. These materials readily remove the organic species from organic cation-containing molecular sieves and render the so treated molecular sieve particularly susceptible to subsequent ion exchange, e.g., ammonium ion exchange. When calcined, such ammonium exchanged-oxidation agent treated molecular sieve exhibits improved catalytic activity.

Organic cations which can be removed from zeolites in accordance with the present process include alkyl, aryl and mixed aryl-alkyl quaternary ammonium cations. Included are: tetramethylammonium, $NH_3(CH_3)^+$, $NH_2(CH_3)_2^+$ and $NH(CH_3)_3^+$ cations having the following formula:

$$N(R)_nH_{(4-n)}$$

wherein n is an integer from 0 to 4 and R is an alkyl or aryl group. The alkyl group may have between 1 and 5 carbon atoms in the chain. Phenyl is representative of an aryl group. Additionally, organic cations contained in a zeolite which can be removed include those having the formula:

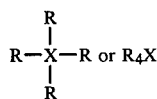

wherein X is an element of Group V-A of the Periodic Table having an atomic number greater than 7 and R is hydrogen, an alkyl group having between 1 and 5 carbon atoms in the chain or an aryl group. X can be phosphorus, arsenic or antimony. Crystalline zeolites from a reaction mixture containing an oxide of 1,4-dimethyl-1,4-diazoniabicyclo[2,2,2] octane can be treated, pursuant to the present invention, with the specified oxidizing agents to remove the organic cation in the molecular sieve. Examples of such organic cations contained in a zeolite which can be removed include primary monoalkylamines having 2 to 9 carbon atoms, e.g., n-propylamine, isopropylamine, butylamine, ethylamine, n-pentylamine, n-hexylamine, n-heptylamine, n-octylamine and n-nonylamine. This type of organic cation is referred to in U.S. Pat. No. 4,151,189 which is incorporated herein by reference. Non-limiting examples of monoalkylamines include those in conjunction with the halides, e.g., flourides, chlorides and bromides, especially alkyl halides such as n-propylbromide. Alkyldiamines selected from the group consisting of pentanediamine, hexanediamine, and combinations thereof are included in the group of organic cations which can be removed from the zeolite. Alkyldiamines are referred to in U.S. Pat. No. 4,139,600 which is incorporated herein by reference. Specific examples of alkyldiamines include 1,6-hexanediamine and 1,5-pentanediamine. In addition, organic cations contained in zeolites which can be removed include ethylenediamine, pyrrolidine and 2-(hydroxyalkyl)trialkylammonium compound wherein alkyl is methyl, ethyl or a combination of the two, e.g., 2-(hydroxyethyl)trimethylammonium chloride.

In one specific embodiment of the invention, catalysts containing low sodium-ZSM-5, formulated for use in the fluid bed conversion of methanol to gasoline, were prepared using ZSM-5 that had been treated in the aqueous phase with NaOCl, an oxidizing agent, to reduce or eliminate the organic content of the zeolite, and then dispersing the ZSM-5 in a $SiO_2/Al_2O_3$ gel matrix, spray drying, ion exchanging and final processing. In addition to the intended effect of reducing the need of a final calcination step in a controlled atmosphere to remove the organics, additional and unexpected advantages were observed in the catalyst. The catalyst had improved physical and catalytic properties, as measured by the higher attrition resistance and the cycle length in the conversion of methanol to gasoline.

The NaOCl apparently changed the degree of dispersion of the zeolite in the $SiO_2/Al_2O_3$ matrix which accounted for the higher attrition resistance and higher zeolite utilization catalytically. This improved dispersion is applicable to and can be utilized with other composite catalysts containing zeolites, such as cracking catalysts, both fluid and moving bed, aromatics processing catalysts (MVPI, EB, PET, TDP, etc.) and petroleum processing catalysts (MLDW, MDDW, M-forming, etc.). It may also be applicable to noncatalytic applications, such as adsorption, which use composite zeolite catalysts. The treatment is not limited to hypochlorites, but to a class of chemical treating agents that will improve the dispersive properties of zeolites, as defined above.

In order to fully illustrate the nature of the invention and the manner of practicing the same, the following examples are presented.

EXAMPLE 1

A sodium silicate solution was prepared by mixing 16 parts water and 27.7 parts sodium silicate (28.7 wt % $SiO_2$, 8.9 wt % $Na_2O$, 62.4 wt % $H_2O$) followed by addition of 0.08 parts Daxad 27 (W. R. Grace Chemical Division). The solution was cooled to approximately 15° C.

An acid solution was prepared by adding one part aluminum sulfate (17.2 wt % $Al_2O_3$) to 16.4 parts water followed by 2.4 parts sulfuric acid (93 wt % $H_2SO_4$) and 1.2 parts NaCl.

These solutions were mixed in an agitated vessel while 3.9 parts of NaCl were added. The gel molar ratios expressed as oxides are the following:

$SiO_2/Al_2O_3 = 78.4$
$Na_2O/Al_2O_3 = 49.5$

The gel was then heated to about 93° C., agitation was reduced and an organic solution containing 0.8 parts n-propylbromide and 1.5 parts methyl ethyl ketone was added above the gel. After these organics were added, 2.3 parts of n-propylamine was added to the organic phase above the gel. This mixture was held at about 93° C. for 6 hours, then severe agitation was resumed. Crystallization was conducted at 93°-99° C. until the gel was 80% crystallized, at which time temperature was increased to 150°-160° C. Unreacted organics were removed by flashing and the remaining contents cooled. The zeolite slurry product was diluted with 4-5 parts water per part slurry and 0.0002 parts of flocculent (Rohm & Haas, Primafloc C-7) per part slurry, allowed to settle and supernant liquid was drawn off. The settled solids were reslurried to the original volume of the preceding step with water and 0.00005 parts of flocculant per part slurry. After settling, the aqueous phase was decanted. This was repeated until the sodium level of the zeolite was less than 0.10 wt %. Then 0.1 parts ammonium nitrate per part slurry were added to the settled solids and the water from the previous decantation. The mixture was reslurried and the solids were allowed to settle. The washed zeolite solids were filtered and identified as ZSM-5 by X-ray diffraction.

EXAMPLE 2

This example was identical to Example 1 through the crystallization procedure. The wash decantation step was repeated until the sodium level of the zeolite was less than 0.15 wt %. However, in contrast to Example 1, ammonium nitrate was not added in the final wash decantation step. Approximately half of the washed zeolite solids was filtered while the other half was kept as a slurry for further treatment as described in Example 4.

EXAMPLE 3

This example describes the NaOCl treatment of a portion of the low Na ZSM-5 synthesized in Example 1. One part aqueous NaOCl solution (12.5 wt %) was washed per one part low Na ZSM-5 slurry (35 wt % solids) and the mixture was agitated for 4 hours at room temperature. The solids were then filtered and continuous $H_2O$ washed on a Buchner funnel until NaOCl was no longer detectable by potassium iodide indicator paper. The product was then dried at 120° F.

EXAMPLE 4

0.55 parts aqueous NaOCl solution (9.97 wt %) were added per part ZSM-5 slurry (7.64% ZSM-5) from Example 2. The mixture was agitated mildly at room temperature for 24 hours. 3.2 parts $H_2O$ were then added followed by 0.01 parts $Na_2SO_3$ solution (5.7 wt %) to neutralize the NaOCl. The mixture was then decant washed, and followed by filtration.

The chemical analysis results for the product obtained from Examples 1-4 are given in Table 1.

EXAMPLES 5-9

NaOCl treatment of the ZSM-5 product of Example 1.

These examples are provided to show the effect of NaOCl to reduce C and N in low Na ZSM-5, while NaOH and $H_2O$ failed to show any effect. (See Table 2 for conditions).

Examples 10-15 below detail the procedures used for compositing the zeolite product from Examples 1-4 into a $SiO_2/Al_2O_3$ matrix to make the fluid catalyst (while not provided in these examples the zeolite may also be combined with $Al_2O_3$ powder and extruded to make a fixed-bed catalyst).

EXAMPLE 10

Solution A, containing 4.04 parts sodium silicate (28.7 wt % $SiO_2$, 8.9 wt % $Na_2O$, 62.4 wt % $H_2O$) and 9.74 parts water, was nozzle mixed with solution B, containing one part aluminum sulfate (17.2 wt % $Al_2O_3$) and 6.42 parts water. The resulting gel was agitated at 90 RPM for 15 minutes followed by addition of sufficient NaOH (50% solution) to adjust the gel pH to 7.2-8.0. The gel was then aged for two hours at pH 7.2-8.0 followed by a pH reduction to 4.2-4.8, achieved by the addition of $H_2SO_4$ (20 wt % solution). To the resulting gel was added a slurry containing 2.88 parts low Na ZSM-5 wetcake (30.7% solid, from Ex. 1) and 1.6 parts water. The slurry was then mixed approximately ½ hour at 90 RPM, filtered on a rotary filter, reslurried to 10.5% solids, homogenized, and spray dried. The spray dried material was converted into the active catalyst form by $NH_4^+$ exchange and final calcination procedures.

EXAMPLE 11

The fluid catalyst of this example was synthesized by the identical procedure as described in the above Example 10, using the zeolite from Example 4.

EXAMPLE 12

This fluid catalyst preparation differs from Example 10 in that 0.083 parts of a 50 wt % NaOH solution was added to solution A prior to nozzle mixing and the zeolite used was that described in Example 1.

EXAMPLE 13

The fluid catalyst of this example differs from Example 12 only in that the zeolite used was that described in Example 3.

EXAMPLE 14

The fluid catalyst of this example was synthesized by adding 0.18 parts of a 96 wt % $H_2SO_4$ solution to solution A (of Example 10) followed by the addition of solution B (of Example 10). This procedure is in contrast to the nozzle-mix procedure employed in Examples 10-13. The resulting gel was processed into a fluid catalyst using the procedures described in Example 10. The zeolite used in this example was the zeolite described in Example 2.

EXAMPLE 15

The fluid catalyst of this example differs from Example 14 only in that the zeolite used was that described in Example 4.

The methanol conversion catalysts containing NaOCl treated ZSM-5 were found to be active, selective, and gave increased cycle length in the fluid bed methanol conversion test. As indicated by the data of Table 3, the NaOCl treatment of the ZSM-5 resulted in enhanced alpha values (a measure of the catalyst acidity) of the resulting fluid catalysts.

The physical properties for the fluid catalysts prepared in Examples 11-15 are summarized in Table 4. The data indicate an increased catalyst density and improved attrition resistance of the catalysts using the NaOCl treated ZSM-5.

TABLE 1

Effect of NaOCl Treatment on the Chemical Composition of Low Na ZSM-5

| Example | 1 | 2 | 3 | 4 |
|---|---|---|---|---|
| Chemical Comp. | | | | |
| SiO$_2$, wt % | 81.2 | 87.6 | 87.4 | 86.5 |
| Al$_2$O$_3$, wt % | 2.20 | 2.57 | 2.54 | 2.66 |
| Na, wt. % | 0.02 | 0.15 | 0.45 | 0.96 |
| N, wt % | 1.36 | 1.10 | 0.60 | 0.80 |
| C, wt % | 4.77 | 5.40 | 3.08 | 4.40 |
| Ash | 86.4 | 91.2 | 93.4 | 92.5 |
| Mole Ratios | | | | |
| Al$_2$O$_3$ | 1 | 1 | 1 | 1 |
| SiO$_2$ | 62.6 | 57.8 | 58.4 | 55.6 |
| Na | 0.04 | 0.26 | 0.79 | 1.60 |
| N | 4.50 | 3.12 | 1.72 | 2.19 |
| C | 18.4 | 17.85 | 10.30 | 14.05 |
| C/N | 4.09 | 5.73 | 5.99 | 6.40 |

TABLE 2

Chemical Composition of NaOCl Treated ZSM-5

| | Example 5 | Example 6 | Example 7 | Example 8 | Example 9 |
|---|---|---|---|---|---|
| Base Material | Washed Low Sodium ZSM-5 Product of Example 1 | | | | |
| | 100 g wet cake, 35% solids | | | | 300 g |
| Chemical Treat | | | | | |
| 12.5% wt. NaOCl | 100 g | — | 100 g | — | 300 g |
| 0.1 N NaOH, ml | — | 100 g | — | — | — |
| 0.5 N HCl, ml | 18 | — | — | — | 30 (conc.) |
| H$_2$O | — | — | — | 100 g | — |
| pH of the Slurry | 11.4 | 12.3 | 12.5 | 7.5 | 6.0 |
| Treat Condition | Agitate at R.T. for 4 hours | | | | |
| Chemical Composition after Treatment | | | | | |
| SiO$_2$, wt. % | 85.1 | 87.0 | 85.4 | 85.6 | 85.8 |
| Al$_2$O$_3$, wt. % | 2.4 | 2.5 | 2.3 | 2.4 | 2.4 |
| Na, wt. % | 0.95 | 0.09 | 0.99 | 0.02 | 0.37 |
| N, wt. % | 0.71 | 1.28 | 0.76 | 1.30 | 0.74 |
| C, wt. % | 3.33 | 5.08 | 3.38 | 5.62 | 2.86 |
| Ash | 92.2 | 91.0 | 91.3 | 91.2 | 90.2 |
| Mole Ratios | | | | | |
| Al$_2$O$_3$ | 1 | 1 | 1 | 1 | 1 |
| SiO$_2$ | 60.27 | 59.16 | 63.12 | 60.6 | 60.78 |
| Na | 1.76 | 0.16 | 1.91 | 0.04 | 0.68 |
| N | 2.16 | 3.73 | 2.41 | 3.95 | 2.25 |
| C | 11.79 | 14.80 | 12.49 | 19.90 | 10.13 |
| C/N | 5.5 | 3.97 | 5.18 | 5.03 | 4.5 |

TABLE 3

Catalytic Evaluations (A) Alpha ($\alpha$) Test* Results of MeOH Conversion Catalyst

| Example | Zeolite Used From Ex. | Zeolite NaOCl Treated | Alpha Value (at 1000° F.) |
|---|---|---|---|
| 10 | 1 | No | 117 |
| 11 | 4 | Yes | 251 |
| 12 | 1 | No | 126 |
| 13 | 3 | Yes | 162 |
| 14 | 2 | No | 115 |
| 15 | 4 | Yes | 197 |

(B) Cycle Length Results for Fluid Methanol Conversion Catalyst, 2 WHSV, 775° F., 29 psig

| Catalyst of Example | Zeolite NaOCl Treated | Cycle Length,** Hours |
|---|---|---|
| 10 | No | 113 |
| 13 | Yes | 180 |
| 14 | No | 74 |
| 15 | Yes | 162 |

*Alpha ($\alpha$) test may be found described in a letter to the editor, entitled "Superactive Crystalline Aluminosilicate Hydrocarbon Cracking Catalysts" by P. B. Weisz and J. N. Miale, Journal of Catalysis, Vol. 4, pp. 527-529 (August 1965) and in U.S. Pat. No. 3,354,078.
**The cycle is considered completed when the concentration of methanol in the reactor effluent is greater than 0.5 wt. %.

TABLE 4

Comparison of Physical Properties

| Catalyst of Example | Percent Zeolite | Matrix SiO$_2$/Al$_2$O$_3$ | Zeolite NaOCl Treated | Surface Area m$^2$/gm | Real Density gm/cc | Particle Density gm/cc | Pore Vol. cc/gm | Packed Density gm/cc | Catalyst Attrition Index[1] |
|---|---|---|---|---|---|---|---|---|---|
| 10 | 40 | 87/13 | No | 307 | 2.26 | 0.81 | 0.79 | 0.54 | 80 |
| 11 | 40 | 87/13 | Yes | 290 | 2.29 | 1.02 | 0.55 | 0.63 | 16 |
| 12 | 40 | 87/13 | No | 342 | 2.23 | 0.75 | 0.87 | 0.50 | 88 |
| 13 | 40 | 87/13 | Yes | 276 | 2.22 | 1.06 | 0.49 | 0.69 | 10 |
| 14 | 40 | 87/13 | No | 408 | 2.28 | 0.72 | 0.95 | 0.48 | 19 |
| 15 | 40 | 87/13 | Yes | 373 | 2.27 | 0.86 | 0.72 | 0.56 | 7 |

[1]The attrition index is determined as follows: a sample of calcined catalyst is contacted in a 1 inch i.d., "U" tube with an air jet formed by passing humidified air at 21 liters/min. through a 0.07 inch diameter nozzle for one hour. Catalyst fines (0-15$\mu$) are removed as formed in the Roller apparatus and caught in a paper collection thimble. After recombing the catalyst sample, the particle size is determined; the attrition index is the increase in fines (0-20$\mu$) fraction caused by the attrition phase:

$$\text{attrition index} = 100 \times \frac{WA - WB}{100 - WB}$$

where
WA = wt % of 0-20$\mu$ fraction after attrition
WB = wt % of 0-20$\mu$ fraction before attrition.

The oxidation potential values referred to were those described in and obtained from "Oxidation Potentials", W. M. Latimer, second edition, Prentice-Hall, 1952, and "Advanced Inorganic Chemistry" by F. A. Cotton and G. Wilkenson, Interscience Publishing, 1962.

What is claimed is:

1. A method of removing organic species from an organic nitrogen cation-containing zeolite to improve the dispersive properties thereof, in turn, resulting in catalysts of enhanced catalytic and physical properties which comprises contacting said zeolite with a solution comprising sodium hypochloride, said contact being conducted at temperatures below 100° F.

2. A method according to claim 1 wherein said cation consists of a primary alkylamine having 2 to 9 combinations.

3. A method according to claim 2 wherein said cation is n-propylamine, isopropylamine, butylamine, ethylamine, n-pentylamine, n-hexylamine, n-heptylamine, n-octylamine or n-nonylamine.

4. A method according to claim 1 wherein said cation consists of an alkyldiamine selected from the group consisting of pentanediamine, hexanediamine and combinations thereof.

5. A method according to claim 4 wherein said alkyldiamine is 1.6-hexanediamine or 1,5-pentanediamine.

6. A method according to claim 1 wherein said cation consists of a 2-(hydroxyalkyl)trialkylammonium compound wherein alkyl is methyl, ethyl or a combination of the two.

7. A method according to claim 6 wherein said cation is 2-(hydroxyethyl)trimethylammonium chloride.

8. A method according to claim 1 wherein said cation is ethylenediamine.

9. A method according to claim 1 wherein said cation is pyrrolidine.

10. A method according to claim 1 wherein said cation is monoalkylamine in conjunction with an alkyl halide.

11. A method according to claim 9 wherein said alkyl halide is n-propylbromide.

12. A method according to claim 1 wherein said zeolite is ZSM-5.

13. A method according to claim 1 wherein said zeolite is low-sodium ZSM-5.

14. A method according to claim 1 wherein said zeolite is ZSM-11.

15. A method according to claim 1 wherein said zeolite is ZSM-12.

16. A method according to claim 1 wherein said zeolite is ZSM-21.

17. A method according to claim 1 wherein said zeolite is ZSM-23.

18. A method according to claim 1 wherein said zeolite is ZSM-35.

19. A method according to claim 1 wherein said zeolite is ZSM-38.

20. A method according to claim 1 wherein said temperatures are between about 50° and 100° F.

21. A method of removing organic species from an organic cation-containing low-sodium ZSM-5 type zeolite said cation comprising a monoalkylamine to improve the dispersive properties thereof, in turn, resulting in catalysts of enhanced catalytic and physical properties which comprises contacting said low-sodium zeolite with a solution of sodium hypochlorite, said contact being conducted at temperatures below 100° F.

22. A method according to claim 21 wherein said monoalkylamine is normal propylamine.

23. A method according to claim 21 wherein said monoalkylamine is in conjunction with an alkyl halide.

24. A method according to claim 23 wherein said alkyl halide is normal propylbromide.

* * * * *